United States Patent
Miyachi

(10) Patent No.: US 12,458,311 B2
(45) Date of Patent: Nov. 4, 2025

(54) MEDICAL IMAGE DIAGNOSTIC APPARATUS AND CONTROL METHOD FOR MEDICAL IMAGE DIAGNOSTIC APPARATUS

(71) Applicant: FUJIFILM Corporation, Tokyo (JP)

(72) Inventor: Yukiya Miyachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 7 days.

(21) Appl. No.: 18/621,015

(22) Filed: Mar. 28, 2024

(65) Prior Publication Data
US 2024/0324979 A1    Oct. 3, 2024

(30) Foreign Application Priority Data
Mar. 29, 2023   (JP) ................................ 2023-053009

(51) Int. Cl.
*A61B 8/00* (2006.01)
*A61B 6/00* (2024.01)
(Continued)

(52) U.S. Cl.
CPC ............ *A61B 6/502* (2013.01); *A61B 6/0414* (2013.01); *A61B 6/461* (2013.01); *A61B 6/5247* (2013.01);
(Continued)

(58) Field of Classification Search
CPC ..... A61B 6/502; A61B 6/5247; A61B 8/0825; A61B 8/5261; A61B 8/523
See application file for complete search history.

(56) References Cited

U.S. PATENT DOCUMENTS

2009/0088637 A1  4/2009  Mikami
2015/0139518 A1  5/2015  Oohashi et al.
(Continued)

FOREIGN PATENT DOCUMENTS

JP    2014-014489 A    1/2014

OTHER PUBLICATIONS

The extended European search report issued by the European Patent Office on Jul. 18, 2024, which corresponds to European Patent Application No. 24167361.5-1122 and is related to U.S. Appl. No. 18/621,015.

*Primary Examiner* — Colin T. Sakamoto
(74) *Attorney, Agent, or Firm* — Studebaker Brackett PLLC

(57) ABSTRACT

Provided are a medical image diagnostic apparatus and a control method of a medical image diagnostic apparatus capable of improving an accuracy of an examination on a subject.
A medical image diagnostic apparatus includes an ultrasound probe, a probe moving device that moves the ultrasound probe along the surface of the compression plate, an ultrasound data acquisition unit that acquires ultrasound data of the breast using the ultrasound probe with respect to the breast compressed by the compression plate, a monitor that displays the radiation image, a line generation unit that generates an ultrasound image acquisition line, which is displayed on the radiation image and designates a position of an ultrasound image representing a tomographic section of the breast, and an ultrasound image generation unit that generates an ultrasound image in the ultrasound image acquisition line based on the ultrasound data acquired in correspondence with the ultrasound image acquisition line, in which the ultrasound image is displayed on the monitor.

17 Claims, 7 Drawing Sheets

(51) Int. Cl.
    *A61B 6/04*           (2006.01)
    *A61B 6/46*           (2024.01)
    *A61B 6/50*           (2024.01)
    *A61B 8/08*           (2006.01)

(52) U.S. Cl.
    CPC ............ *A61B 8/0825* (2013.01); *A61B 8/403* (2013.01); *A61B 8/4416* (2013.01); *A61B 8/4488* (2013.01); *A61B 8/461* (2013.01)

(56) References Cited

U.S. PATENT DOCUMENTS

| | | |
|---|---|---|
| 2015/0221091 A1 | 8/2015 | Sugiyama et al. |
| 2017/0281131 A1 | 10/2017 | Sendai |
| 2020/0134884 A1 | 4/2020 | Morita |

MEDICAL IMAGE DIAGNOSTIC APPARATUS AND CONTROL METHOD FOR MEDICAL IMAGE DIAGNOSTIC APPARATUS

CROSS-REFERENCE TO RELATED APPLICATIONS

The present application claims priority under 35 U.S.C. § 119 to Japanese Patent Application No. 2023-053009, filed on Mar. 29, 2023. The above application is hereby expressly incorporated by reference, in its entirety, into the present application.

BACKGROUND OF THE INVENTION

1. Field of the Invention

The present invention relates to a medical image diagnostic apparatus that performs an examination of a breast of a subject, and a control method of the medical image diagnostic apparatus.

2. Description of the Related Art

In the related art, an examination is performed by capturing a radiation image using a so-called radiographic apparatus and capturing an ultrasound image using a so-called ultrasound diagnostic apparatus with respect to a breast of a subject. In such an examination, in general, a user such as a doctor grasps a region suspected to be a lesion in the breast by checking the radiation image, and performs the examination on the subject by checking the ultrasound image of the region suspected to be a lesion.

In this case, the user is required to accurately interpret the radiation image and accurately capture the ultrasound image of a suspected lesion region shown in the radiation image, but it may be difficult for a user with a low level of skill. Therefore, the technique of JP2014-014489A has been developed to allow the user to easily check the ultrasound image of the suspected lesion region shown in the radiation image. JP2014-014489A discloses specifying an ultrasound image captured at a position corresponding to a region designated on a radiation image based on a position of an ultrasound probe detected by a sensor device such as a so-called magnetic sensor.

SUMMARY OF THE INVENTION

However, in the technique of JP2014-014489A, since the radiation image is captured in a state in which the breast is compressed by a so-called compression plate whereas the ultrasound image is captured in a state in which the breast is not compressed by the compression plate, the accuracy of the registration between the region on the radiation image and the ultrasound image may not be sufficiently secured. Therefore, it may be difficult to acquire the ultrasound image that accurately corresponds to the position on the radiation image, and it may be difficult to perform an accurate examination.

The present invention has been made in order to solve such a problem in the related art, and an object of the present invention is to provide a medical image diagnostic apparatus and a control method of a medical image diagnostic apparatus which is capable of improving accuracy of an examination on a subject.

According to the following configuration, the above-described object can be achieved.

[1] A medical image diagnostic apparatus that acquires a radiation image of a breast of a subject in a state in which the breast is compressed by a compression plate, the medical image diagnostic apparatus comprising:
  an ultrasound probe that is disposed to be in contact with a surface of the compression plate;
  a probe moving device that moves the ultrasound probe along the surface of the compression plate;
  an ultrasound data acquisition unit that acquires ultrasound data of the breast in an imaging region determined by performing transmission and reception of an ultrasound wave using the ultrasound probe moved by the probe moving device with respect to the breast compressed by the compression plate;
  a monitor that displays the radiation image;
  a line generation unit that generates an ultrasound image acquisition line, which is displayed on the radiation image displayed on the monitor in a superimposed manner and designates a position of an ultrasound image representing a tomographic section of the breast; and
  an ultrasound image generation unit that generates an ultrasound image at a position of the ultrasound image acquisition line based on the ultrasound data acquired by the ultrasound data acquisition unit in correspondence with the ultrasound image acquisition line generated by the line generation unit,
  in which the ultrasound image generated by the ultrasound image generation unit is displayed on the monitor.

[2] The medical image diagnostic apparatus according to [1], in which the line generation unit generates the ultrasound image acquisition line at a position designated by a user on the radiation image.

[3] The medical image diagnostic apparatus according to [2], in which the ultrasound data acquisition unit displays the determined imaging region on the monitor in correspondence with the radiation image, and
  the line generation unit generates the ultrasound image acquisition line at a position designated by the user in the determined imaging region.

[4] The medical image diagnostic apparatus according to [2], in which the ultrasound probe includes a transducer array in which a plurality of transducers are arranged,
  the line generation unit generates a linear ultrasound image acquisition line extending in an arrangement direction of the plurality of transducers, and
  the ultrasound image acquisition line is displayed on the monitor to be movable in a direction orthogonal to the arrangement direction of the plurality of transducers by a designation of the user.

[5] The medical image diagnostic apparatus according to [4], the ultrasound image acquisition line is displayed on the monitor to be rotatable by a designation of the user.

[6] The medical image diagnostic apparatus according to [1], further comprising: a lesion detection unit that detects a suspected lesion region based on the radiation image,
  in which the line generation unit generates the ultrasound image acquisition line positioned at the suspected lesion region of the radiation image detected by the lesion detection unit.

[7] The medical image diagnostic apparatus according to [6], in which the ultrasound image generation unit generates a plurality of the ultrasound images in a vicinity of the ultrasound image acquisition line, and the plurality of ultrasound images are displayed on the monitor.

[8] The medical image diagnostic apparatus according to any one of [1] to [7], in which the ultrasound data acquisition unit includes a drive controller that drives and controls the probe moving device such that the ultrasound data of the breast in an entire range in the determined imaging region is acquired by scanning the ultrasound probe.

[9] The medical image diagnostic apparatus according to any one of [1] to [8], in which the ultrasound image generation unit generates a three-dimensional ultrasound image.

[10] A control method of a medical image diagnostic apparatus that acquires a radiation image of a breast of a subject in a state in which the breast is compressed by a compression plate, the control method comprising:

disposing an ultrasound probe to be in contact with a surface of the compression plate;

moving the ultrasound probe along the surface of the compression plate;

acquiring ultrasound data of the breast in an imaging region determined by performing transmission and reception of an ultrasound wave using the ultrasound probe with respect to the breast compressed by the compression plate;

displaying the radiation image on the monitor;

generating an ultrasound image acquisition line representing a position of an ultrasound image to be acquired and displaying the ultrasound image acquisition line on the radiation image displayed on the monitor in a superimposed manner;

generating an ultrasound image at a position of the ultrasound image acquisition line based on the ultrasound data acquired in correspondence with the ultrasound image acquisition line; and displaying the generated ultrasound image on the monitor.

According to the present invention, there is provided a medical image diagnostic apparatus comprising an ultrasound probe that is disposed to be in contact with a surface of the compression plate, a probe moving device that moves the ultrasound probe along the surface of the compression plate, an ultrasound data acquisition unit that acquires ultrasound data of the breast in an imaging region determined by performing transmission and reception of an ultrasound wave using the ultrasound probe moved by the probe moving device with respect to the breast compressed by the compression plate, a monitor that displays the radiation image, a line generation unit that generates an ultrasound image acquisition line, which is displayed on the radiation image displayed on the monitor in a superimposed manner and designates a position of an ultrasound image representing a tomographic section of the breast; and an ultrasound image generation unit that generates an ultrasound image at a position of the ultrasound image acquisition line based on the ultrasound data acquired by the ultrasound data acquisition unit in correspondence with the ultrasound image acquisition line generated by the line generation unit, in which the ultrasound image generated by the ultrasound image generation unit is displayed on the monitor. Thereby an accuracy of the examination on a subject can be improved.

DESCRIPTION OF THE PREFERRED EMBODIMENTS

Hereinafter, embodiments of the present invention will be described with reference to the accompanying drawings.

The description of components described below is provided based on a representative embodiment of the present invention, but the present invention is not limited to such an embodiment.

In the present specification, a numerical range represented using "to" means a range including numerical values before and after "to" as a lower limit value and an upper limit value.

In the present specification, "same" and "identical" include an error range generally allowed in the technical field.

Embodiment 1

Figure 1:
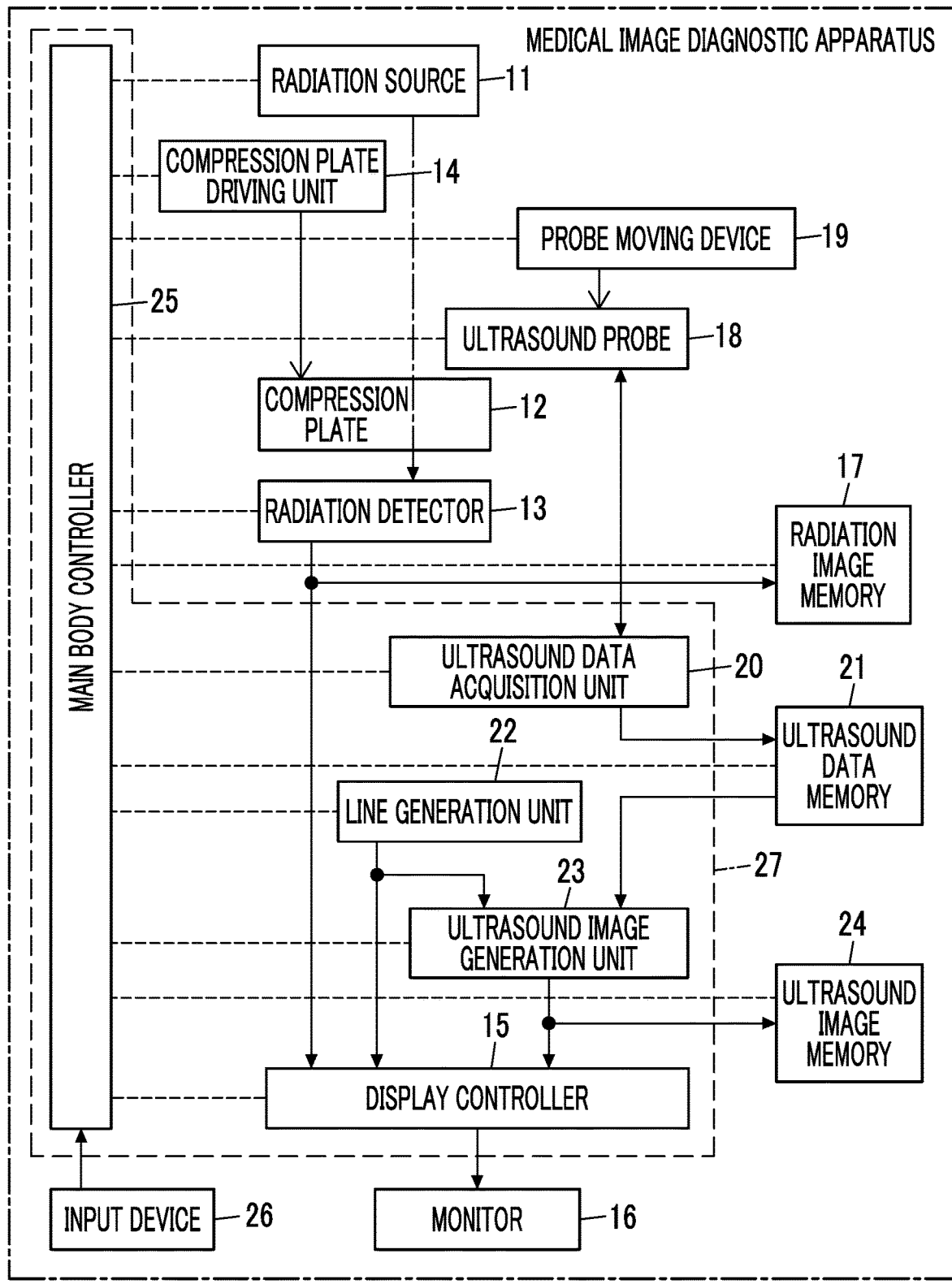
FIG. 1 is a block diagram showing a configuration of a medical image diagnostic apparatus according to an Embodiment 1 of the present invention.

FIG. 1 shows a configuration of a medical image diagnostic apparatus according to an Embodiment 1 of the present invention. The medical image diagnostic apparatus comprises a radiation source 11, a compression plate 12, and a radiation detector 13. A compression plate driving unit 14 is connected to the compression plate 12. Further, a display controller 15 and a monitor 16 are sequentially connected to the radiation detector 13. In addition, a radiation image memory 17 is connected to the radiation detector 13.

In addition, the medical image diagnostic apparatus comprises an ultrasound probe 18. A probe moving device 19 is connected to the ultrasound probe 18. Further, an ultrasound data acquisition unit 20 and an ultrasound data memory 21 are sequentially connected to the ultrasound probe 18. In addition, the medical image diagnostic apparatus comprises a line generation unit 22. The line generation unit 22 is connected to the display controller 15. An ultrasound image generation unit 23 is connected to the ultrasound data memory 21 and the line generation unit 22. The display controller 15 and the ultrasound image memory 24 are connected to the ultrasound image generation unit 23.

In addition, a main body controller 25 is connected to the radiation source 11, the radiation detector 13, the compression plate driving unit 14, the display controller 15, the radiation image memory 17, the ultrasound probe 18, the probe moving device 19, the ultrasound data acquisition unit 20, the ultrasound data memory 21, the line generation unit 22, the ultrasound image generation unit 23, and the ultrasound image memory 24. An input device 26 is connected to the main body controller 25. In addition, the display controller 15, the ultrasound data acquisition unit 20, the line generation unit 22, the ultrasound image generation unit 23, and the main body controller 25 constitute a processor 27 for a medical image diagnostic apparatus.

Figure 2:
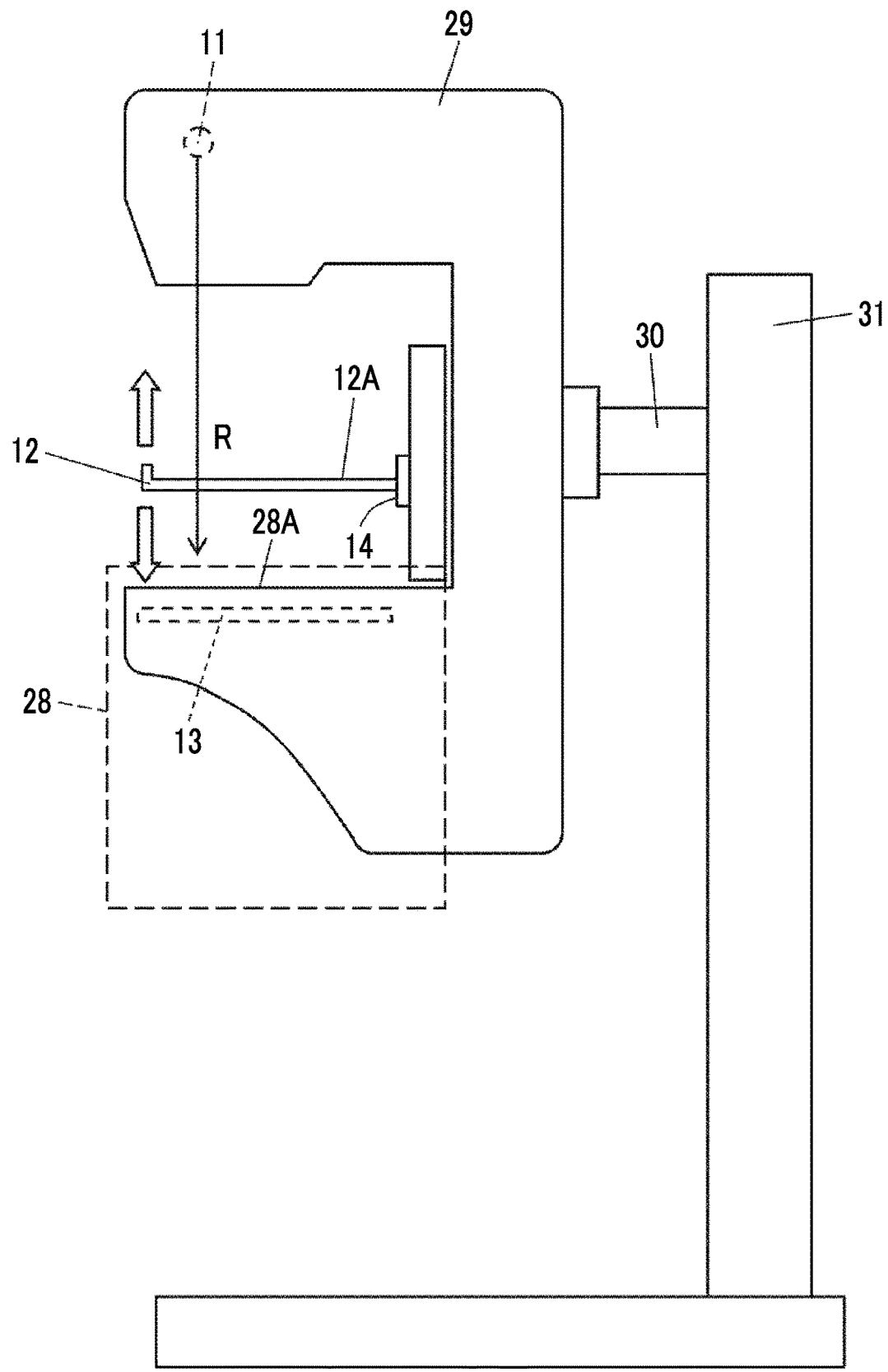
FIG. 2 is a view schematically showing an example of an appearance of the medical image diagnostic apparatus according to the Embodiment 1 of the present invention.

In addition, as shown in FIG. 2, the medical image diagnostic apparatus comprises an imaging table 28 that is positioned directly below the compression plate 12. An imaging surface 28A on which the breast of the subject is disposed in a case of examination is formed in the imaging table 28. In addition, the radiation detector 13 is built in the imaging table 28. The imaging table 28 is formed of, for example, a carbon material or the like and transmits a radiation R emitted from the radiation source 11. The radiation R transmitted through the imaging table 28 reaches the radiation detector 13.

The medical image diagnostic apparatus includes an arm part 29, a shaft part 30, and a base 31. The arm part 29 is movably held in an up-down direction (height direction) by the base 31. The shaft part 30 connects the arm part 29 to the base 31. The arm part 29 can be rotated with the shaft part 30 as a rotation axis with respect to the base 31.

The radiation source 11 emits the radiation R by applying a tube voltage under the control of the main body controller 25. Under the control of the main body controller 25, the inclination angle of the radiation source 11 can be changed and the irradiation direction of the radiation R emitted from the radiation source 11 can be adjusted by rotating the arm part 29 with the shaft part 30 as the rotation axis with respect to the base 31.

The compression plate driving unit 14 moves the compression plate 12 in the up-down direction under the control of the main body controller 25.

The compression plate 12 compresses the breast of the subject disposed on the imaging surface 28A of the imaging table 28 by sandwiching the breast of the subject between the compression plate 12 and the imaging table 28. In addition, the compression plate 12 has an upper surface 12A that is in contact with the ultrasound probe 18, as will be described below. It is preferable that the compression plate 12 is transparent in order to check positioning or a compressed state of the breast in the compression of the breast. In addition, the compression plate 12 is made of a material having high transmittance for the radiation R and the ultrasound wave. As a material of the compression plate 12, for example, a resin material such as polymethylpentene (PMP), polycarbonate (PC), acryl, polypropylene (PP), and polyethylene terephthalate (PET) can be used. In particular, polymethylpentene has low rigidity and is excellent in stretchability and flexibility, and the acoustic impedance that affects the reflectivity of the ultrasound wave is close to that of a human body (breast). Therefore, polymethylpentene is suitable as a material of the compression plate 12.

In a case of capturing the radiation image, the radiation R is emitted from the radiation source 11 in a state in which the breast of the subject is compressed by the compression plate 12. The radiation R transmits through the compression plate 12, the breast of the subject, and the imaging table 28, and reaches the radiation detector 13.

The radiation detector 13 detects the radiation R transmitted through the breast of the subject, and generates the radiation image data of the breast of the subject based on the detected radiation R. Hereinafter, the radiation image data will be simply referred to as a radiation image. The type of the radiation detector 13 is not particularly limited and may be, for example, so-called an indirect conversion type radiation detector that converts the radiation R into light and converts the converted light into a charge, or a direct conversion type radiation detector that directly converts the radiation R into a charge.

The radiation image memory 17 stores the radiation image generated by the radiation detector 13 under the control of the main body controller 25. Here, as the radiation image memory 17, for example, recording media such as a flash memory, a hard disk drive (HDD), a solid state drive (SSD), a flexible disk (FD), a magneto-optical disk (MO disk), a magnetic tape (MT), a random access memory (RAM), a compact disc (CD), a digital versatile disc (DVD), a secure digital card (SD card), or a universal serial bus memory (USB memory) can be used.

The display controller 15 performs predetermined processing on the radiation image data or the like generated by the radiation detector 13 and displays the radiation image or the like on the monitor 16, under the control of the main body controller 25.

The monitor 16 displays the radiation image or the like under the control of the display controller 15, and includes, for example, a display device such as a liquid crystal display (LCD) or an organic electroluminescence display (organic EL display).

The main body controller 25 controls each unit of the medical image diagnostic apparatus on the basis of a control program or the like stored in advance.

The input device 26 is a device for receiving an input operation of the user, and includes, for example, a device such as a keyboard, a mouse, a track ball, a touch pad, and a touch sensor disposed on the monitor 16 in a superimposed manner.

Figure 3:
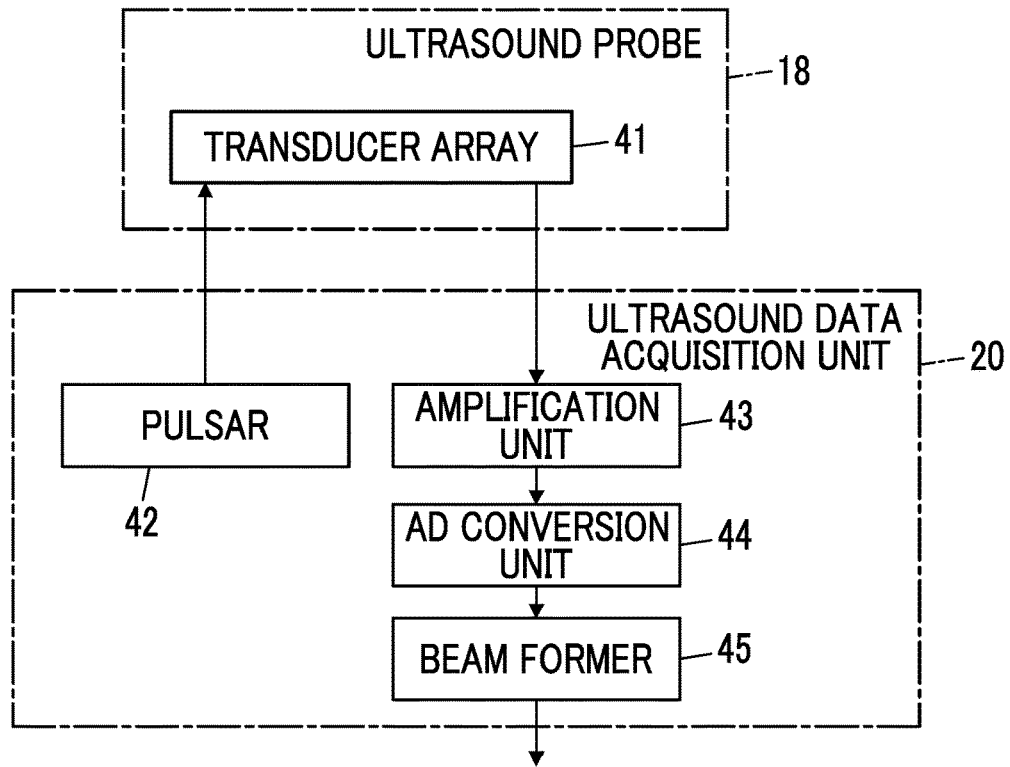
FIG. 3 is a block diagram showing a configuration of an ultrasound data acquisition unit in Embodiment 1 of the present invention.

The ultrasound probe 18 includes a transducer array 41, as shown in FIG. 3, and scans inside the subject by performing transmission and reception of an ultrasound beam from the transducer array 41 toward inside the subject in a state of being disposed to come into contact with a surface of the compression plate 12 that compresses the breast of the subject.

The transducer array 41 of the ultrasound probe 18 includes a plurality of ultrasound transducers one-dimensionally or two-dimensionally arranged. Each of these ultrasound transducers transmits an ultrasound wave in accordance with a drive signal supplied from the ultrasound data acquisition unit 20 and receives an ultrasound echo from a subject to output a signal based on the ultrasound echo. For example, each ultrasound transducer is composed of a piezoelectric body consisting of a piezoelectric ceramic represented by lead zirconate titanate (PZT), a polymer piezoelectric element represented by poly vinylidene di fluoride (PVDF), a piezoelectric single crystal represented by lead magnesium niobate-lead titanate (PMN-PT), or the like, and electrodes formed at both ends of the piezoelectric body.

Figure 4:
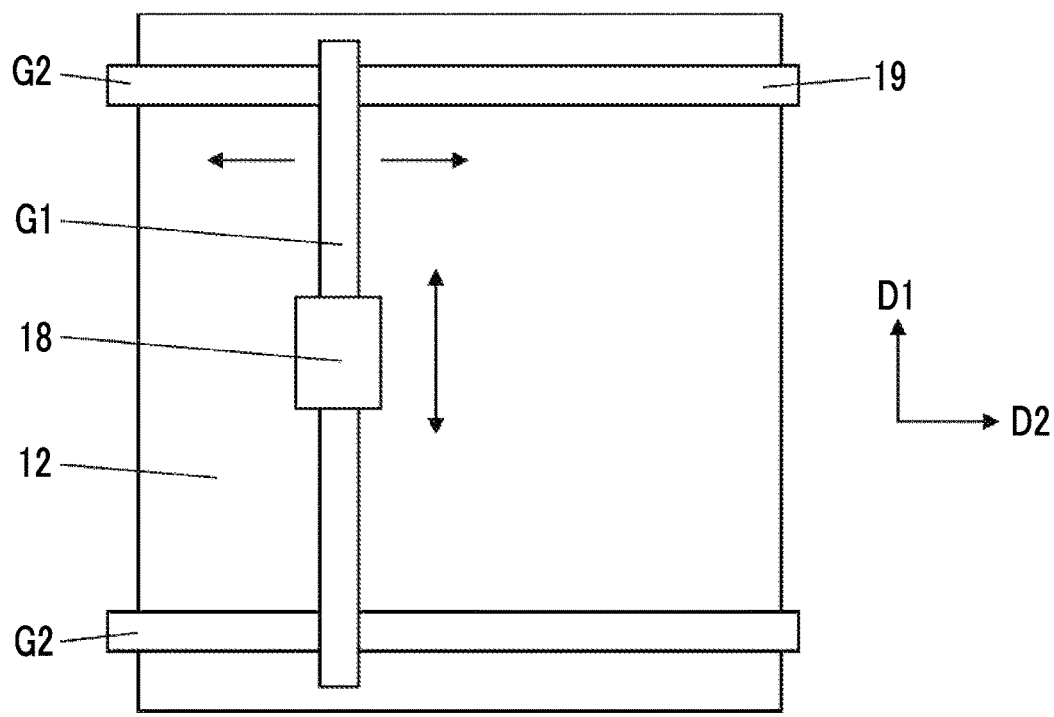
FIG. 4 is a diagram showing an example of a probe moving device in Embodiment 1 of the present invention.

The probe moving device 19 moves the ultrasound probe 18 in a determined imaging region along the surface of the compression plate 12. The probe moving device 19 can have, for example, a probe height adjustment unit (not shown) that moves the ultrasound probe 18 in an up-down direction (height direction) of the medical image diagnostic apparatus to bring the ultrasound probe 18 into contact with the upper surface 12A of the compression plate 12, a first guide G1 that extends along a determined first direction D1 and to which the ultrasound probe 18 is attachable to be movable in the first direction D1, and a second guide G2 that extends along a determined second direction D2 orthogonal to the first direction D1 and to which the first guide G1 is attachable to be movable in the second direction D2, as shown in FIG. 4. The probe moving device 19 can move the ultrasound probe 18 two-dimensionally along the surface of the compression plate 12 by moving the first guide G1 along the second guide G2 and moving the ultrasound probe 18 along the first guide G1.

The determined imaging region along the surface of the compression plate 12 can be determined in advance, for example, and can be designated by a user, such as a doctor, via the input device 26.

In FIG. 4, one first guide G1 is movably attached to two second guides G2, and the ultrasound probe 18 is attached to the first guide G1. However, for example, one second guide G2 may be attached to two first guides G1, and the ultrasound probe 18 may be attached to the second guide G2.

The probe moving device 19 can move the ultrasound probe 18 based on an input operation of the user via the input device 26, for example. In addition, the medical image diagnostic apparatus can further comprise a driving controller (not shown) that drives and controls the probe moving device 19 such that ultrasound data of the breast B in all ranges in the imaging region determined by scanning the ultrasound probe 18 is acquired. In this case, the probe moving device 19 can automatically move the ultrasound probe 18 under the control of the driving controller.

The ultrasound data acquisition unit 20 acquires the ultrasound data of the breast in a determined imaging region by performing transmission and reception of ultrasound waves using the ultrasound probe 18 that is moved by the probe moving device 19 with respect to the breast in a state of being compressed by the compression plate 12. As shown in FIG. 3, the ultrasound data acquisition unit 20 includes a pulsar 42 connected to the transducer array 41, and an amplification unit 43, an analog-to-digital (AD) conversion unit 44, and a beam former 45 that are sequentially connected in series to the transducer array 41.

The pulsar 42 includes, for example, a plurality of pulse generators, and adjusts an amount of delay of each of drive signals and supplies the drive signals to the plurality of ultrasound transducers such that ultrasound waves transmitted from the plurality of ultrasound transducers of the transducer array 41 form an ultrasound beam based on a transmission delay pattern selected according to a control signal from the main body controller 25. In this way, in a case where a pulsed or continuous wave-like voltage is applied to the electrodes of the ultrasound transducer of the transducer array 41, the piezoelectric body expands and contracts to generate a pulsed or continuous wave-like ultrasound wave from each of the ultrasound transducers, whereby an ultrasound beam is formed from the combined wave of these ultrasound waves.

The transmitted ultrasound beam is reflected in, for example, a target such as a site of the subject and propagates toward the transducer array 41 of the ultrasound probe 18. The ultrasound echo propagating toward the transducer array 41 in this way is received by each of the ultrasound transducers constituting the transducer array 41. In this case, each of the ultrasound transducers constituting the transducer array 41 receives the propagating ultrasound echo to expand and contract to generate a reception signal, which is an electrical signal, and outputs these reception signals to the amplification unit 43.

The amplification unit 43 amplifies the signal input from each of the ultrasound transducers constituting the transducer array 41 and transmits the amplified signal to the AD conversion unit 44. The AD conversion unit 44 converts the signals transmitted from the amplification unit 43 into digital reception data. The beam former 45 performs so-called reception focus processing of applying a delay to each reception data received from the AD conversion unit 44 and of adding each reception data together. With the reception focus processing, an ultrasound data obtained by performing phasing addition on each piece of reception data converted with the AD conversion unit 44 and narrowing down a focus of the ultrasound echo is acquired.

The ultrasound data memory 21 stores the ultrasound data generated by the ultrasound data acquisition unit 20 under the control of the main body controller 25. For example, recording media such as a flash memory, an HDD, an SSD, an FD, an MO disc, an MT, a RAM, a CD, a DVD, an SD card, and a USB memory can be used as the ultrasound data memory 21.

Figure 5:
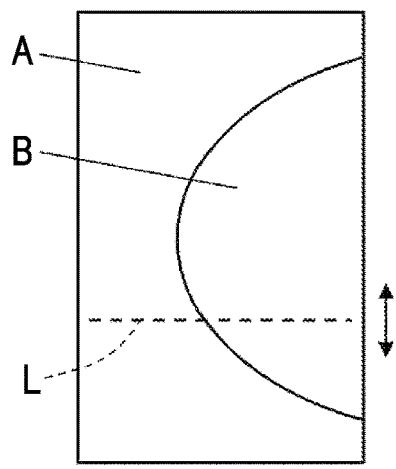
FIG. 5 is a diagram showing an example of an ultrasound image acquisition line displayed on a radiation image in a superimposed manner.

As shown in FIG. 5, the line generation unit 22 generates an ultrasound image acquisition line L that is displayed on the radiation image A displayed on the monitor 16 in a superimposed manner and designates a position of an ultrasound image representing a tomographic section of the breast B of the subject. In this case, the line generation unit 22 can generate a linear ultrasound image acquisition line L extending in an arrangement direction of the plurality of transducers of the transducer array 41. In addition, the line generation unit 22 can generate the ultrasound image acquisition line L at a position designated by the user, such as a doctor, via the input device 26 on the radiation image A, for example. The ultrasound image acquisition line L can be moved in a vertical direction of the radiation image A by the input operation of the user via the input device 26, for example.

In FIG. 5, the example has been described in which the ultrasound image acquisition line L extending in the lateral direction in the radiation image A is superimposed on the radiation image A and the ultrasound image acquisition line L is moved in the vertical direction of the radiation image A. However, for example, the ultrasound image acquisition line L extending in the vertical direction in the radiation image A can be superimposed on the radiation image A and the ultrasound image acquisition line L can be moved in the lateral direction of the radiation image A.

The ultrasound image generation unit 23 generates the ultrasound image at the position of the ultrasound image acquisition line L on the radiation image A based on the ultrasound data acquired by the ultrasound data acquisition unit 20 in correspondence with the ultrasound image acquisition line L generated by the line generation unit 22. More specifically, the ultrasound image generation unit 23 can generate the ultrasound image representing the tomographic section of the breast B at the position of the ultrasound image acquisition line L by using the ultrasound data obtained at the position of the ultrasound image acquisition line L on the radiation image A among the ultrasound data in the determined imaging region, the ultrasound data being obtained by continuously scanning the breast B of the subject in the state in which the ultrasound probe 18 is moved by the probe moving device 19 and is compressed by the compression plate 12.

Figure 6:
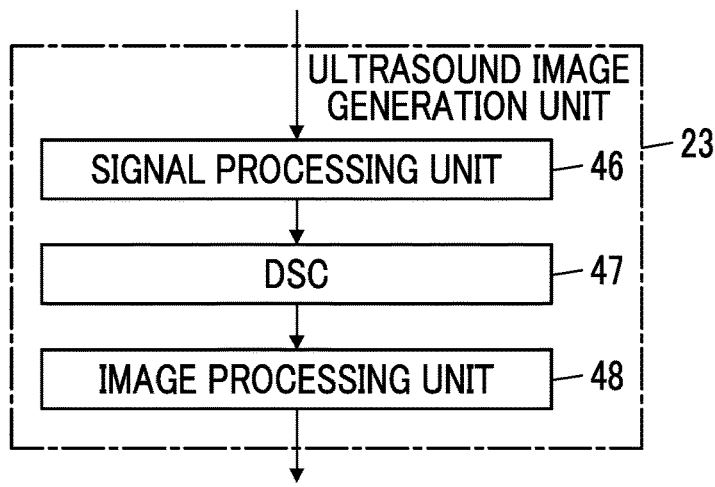
FIG. 6 is a block diagram showing a configuration of an ultrasound image generation unit in Embodiment 1 of the present invention.

As shown in FIG. 6, the ultrasound image generation unit 23 has a configuration in which a signal processing unit 46, a digital scan converter (DSC) 47, and an image processing unit 48 are sequentially connected in series.

The signal processing unit 46 performs correction of attenuation based on a distance on the ultrasound data read out from the ultrasound data memory 21 according to a depth of a reflection position of the ultrasound wave by using a sound velocity value set by the main body controller 25, and then generates a B-mode image signal that is tomographic image information regarding a tissue in the subject by performing an envelope detection processing.

The DSC 47 converts (raster-converts) the B-mode image signal generated in the signal processing unit 46 into an image signal conforming to a normal television signal scanning method.

The image processing unit 48 performs various types of necessary image processing such as gradation processing on the B-mode image signal input from the DSC 47 and then transmits the B-mode image signal to the display controller 15 and the ultrasound image memory 24. Hereinafter, the B-mode image signal that has been subjected to image processing by the image processing unit 48 is referred to as an ultrasound image.

Figure 7:
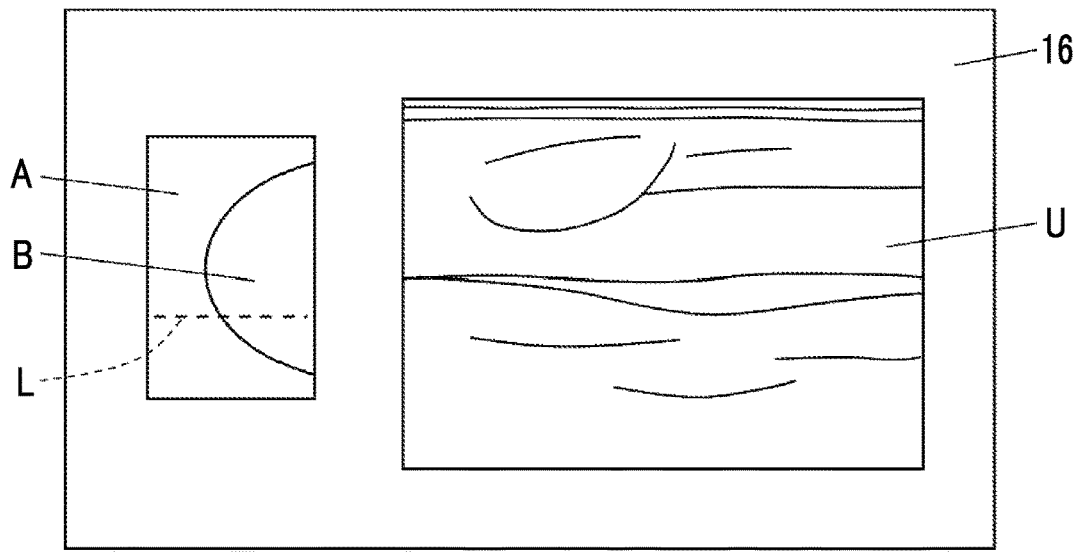
FIG. 7 is a diagram showing a display example of the radiation image and an ultrasound image on a monitor.

For example, as shown in FIG. 7, the display controller 15 can display the radiation image A on which the ultrasound image acquisition line L generated by the radiation detector 13 and generated by the line generation unit 22 are superimposed, and the ultrasound image U corresponding to the ultrasound image acquisition line L on the radiation image A together on the monitor 16. Since the ultrasound image U exactly corresponds to the position of the ultrasound image acquisition line L on the radiation image A, a user, such as a doctor, can exactly perform an examination on the breast B of the subject by checking the ultrasound image U and the radiation image A on which the ultrasound image acquisition line L is superimposed.

The ultrasound image memory 24 stores the ultrasound image U generated by the ultrasound image generation unit 23 under the control of the main body controller 25. For example, recording media such as a flash memory, an HDD, an SSD, an FD, an MO disc, an MT, a RAM, a CD, a DVD, an SD card, and a USB memory can be used as the ultrasound image memory 24.

The processor 27 including the display controller 15, the ultrasound data acquisition unit 20, the line generation unit 22, the ultrasound image generation unit 23, and the main body controller 25 is configured of a central processing unit (CPU) and a control program for causing the CPU to perform various pieces of processing, but may be configured by using a field programmable gate array (FPGA), a digital signal processor (DSP), an application specific integrated circuit (ASIC), a graphics processing unit (GPU), or another integrated circuit (IC), or may be configured by combining the above.

In addition, the display controller 15, the ultrasound data acquisition unit 20, the line generation unit 22, the ultrasound image generation unit 23, and the main body controller 25 of the processor 27 can also be configured by being integrated partially or entirely into one CPU or the like.

Figure 8:
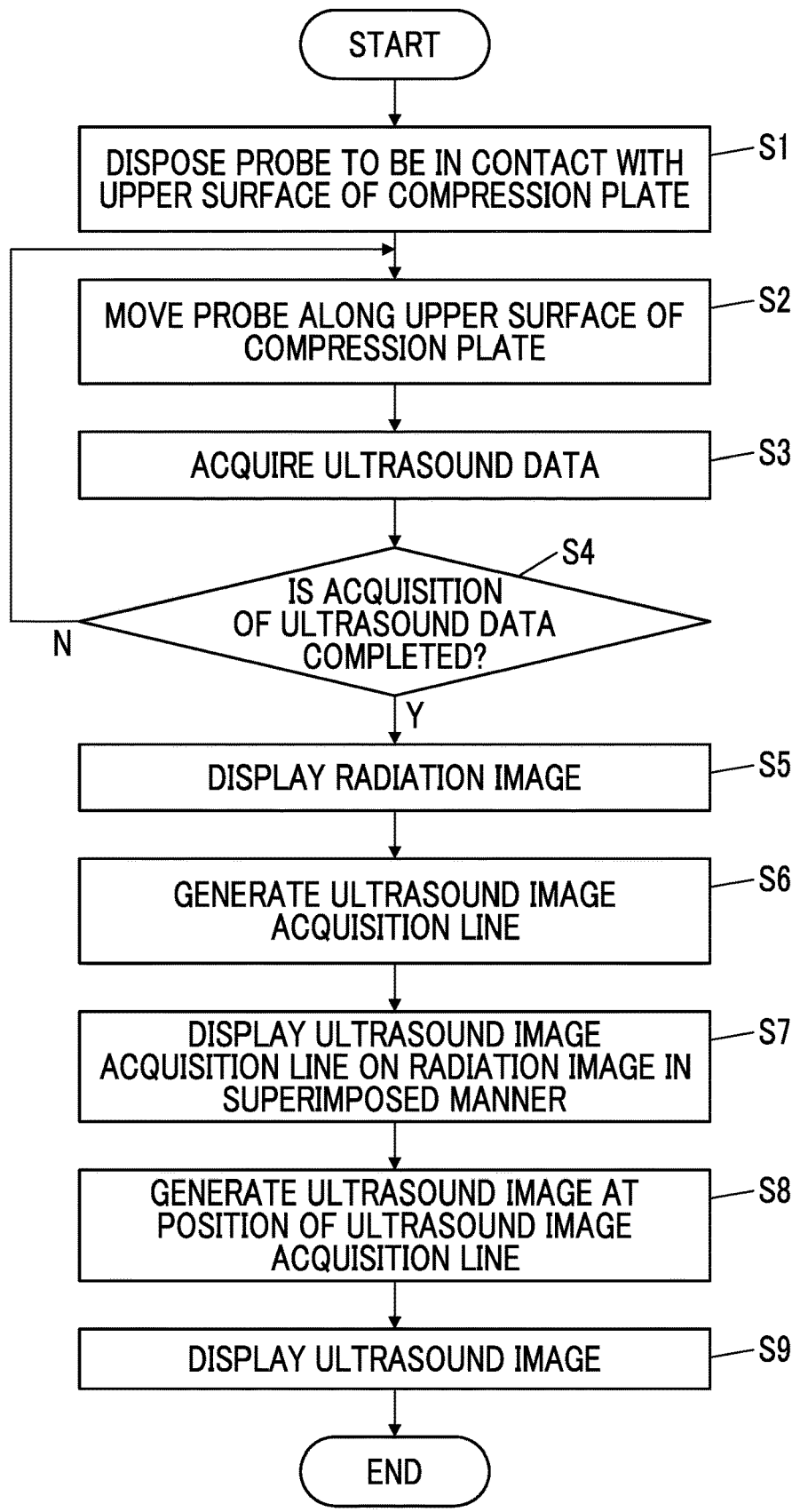
FIG. 8 is a flowchart showing an operation of the medical image diagnostic apparatus according to the Embodiment 1 of the present invention.

Next, an example of the operation of the medical image diagnostic apparatus according to Embodiment 1 will be described using the flowchart of FIG. 8. Hereinafter, it is assumed that the radiation image A of the breast B of the subject has already been captured before the operation of the flowchart of FIG. 8 is started, and the breast B of the subject is in a state of being compressed by the compression plate 12 after the radiation image A is captured.

First, in Step S1, the probe moving device 19 moves the ultrasound probe 18 along the height direction of the medical image diagnostic apparatus to dispose the ultrasound probe 18 to be in contact with the upper surface 12A of the compression plate 12.

In step S2, the probe moving device 19 moves the ultrasound probe 18 in a determined imaging region along the upper surface 12A of the compression plate 12 that compresses the breast B of the subject. In this case, the probe moving device 19 can move the ultrasound probe 18 in the imaging region determined on the basis of the instruction of the user via, for example, the input device 26. In addition, for example, in a case where the medical image diagnostic apparatus includes a driving controller (not shown) that drives and controls the probe moving device 19, the probe moving device 19 can automatically move the ultrasound probe 18 such that ultrasound data in all ranges in the determined imaging region are acquired by the driving controller.

In step S3, the ultrasound data acquisition unit 20 acquires the ultrasound data of the breast B by performing transmission and reception of ultrasound waves with the ultrasound probe 18 that is moved by the probe moving device 19 with respect to the breast B of the subject compressed by the compression plate 12.

In step S4, the main body controller 25 determines whether or not the acquisition of the ultrasound data in the determined imaging region is completed. The main body controller 25 can determine that the acquisition of the ultrasound data is not completed in a case in which the ultrasound data in all the ranges of the determined imaging region are not acquired, and determine that the acquisition of the ultrasound data is completed in a case in which the ultrasound data in all the ranges of the determined imaging region are acquired.

Since the ultrasound data in all the ranges of the determined imaging region are not acquired at the present timing, it is determined that the acquisition of the ultrasound data is not completed, and the process returns to step S2. In step S2, the probe moving device 19 moves the ultrasound probe 18 along the upper surface 12A of the compression plate 12, the ultrasound data acquisition unit 20 acquires the ultrasound data in step S3, and it is determined whether or not the acquisition of the ultrasound data is completed in step S4.

In this way, the processes of step S2 to step S4 are repeated until it is determined that the acquisition of the ultrasound data is completed in step S4, and the ultrasound data of the breast B of the subject is sequentially acquired while the ultrasound probe 18 is moved along the upper surface 12A of the compression plate 12.

In a case where it is determined that the acquisition of the ultrasound data is completed in step S4, the process proceeds to step S5.

In step S5, the display controller 15 displays, on the monitor 16, the radiation image A of the breast B of the subject generated by the radiation detector 13 in a state of being compressed by the compression plate 12.

In step S6, as shown in FIG. 5, the line generation unit 22 generates the ultrasound image acquisition line L that designates a position of the ultrasound image U representing the tomographic section of the breast B of the subject on the radiation image A.

In step S7, the display controller 15 displays the ultrasound image acquisition line L generated in step S6 on the radiation image A displayed on the monitor 16 in step S5 in a superimposed manner. The user can perform a parallel movement of the ultrasound image acquisition line L on the radiation image A via the input device 26.

In step S8, the ultrasound image generation unit 23 generates the ultrasound image U at the position of the ultrasound image acquisition line L on the radiation image A based on the ultrasound data acquired by repeating steps S2 to S4 in correspondence with the position of the ultrasound image acquisition line L displayed on the radiation image A in step S7. The ultrasound image U generated in this way accurately corresponds to the position of the ultrasound image acquisition line L on the radiation image A.

Finally, as illustrated in FIG. 7, for example, the display controller 15 displays the radiation image on which ultrasound image acquisition line L is superimposed in step S7 and the ultrasound image U generated in step S8 together on the monitor 16. Since the ultrasound image U displayed on the monitor 16 exactly corresponds to the position of the ultrasound image acquisition line L on the radiation image A, a user, such as a doctor, can exactly perform an examination on the breast B of the subject by checking the ultrasound image U and the radiation image A on which the ultrasound image acquisition line L is superimposed.

In a case where the processing of step S9 is completed in this manner, the operation of the medical image diagnostic apparatus according to the flowchart of FIG. 8 is completed.

As described above, according to the medical image diagnostic apparatus of the Embodiment 1 of the present invention, the ultrasound probe 18 is disposed to be in contact with the surface of the compression plate 12, the probe moving device 19 moves the ultrasound probe 18 along the surface of the compression plate 12, the ultrasound data acquisition unit 20 acquires ultrasound data of the breast B in the imaging region determined by performing transmission and reception of ultrasound waves with respect to the breast B of the subject compressed by the compression plate 12, the line generation unit 22 generates the ultrasound image acquisition line L designating the position of the ultrasound image U representing the tomographic section of the breast B on the radiation image A, the ultrasound image generation unit 23 generates the ultrasound image U at the position of the ultrasound image acquisition line L on the radiation image A based on the ultrasound data corresponding to the ultrasound image acquisition line L, whereby the user can observe the ultrasound image U accurately corresponding to the position of the ultrasound image acquisition line L on the radiation image A and the accuracy of the examination on the subject can be improved.

It has been described that the ultrasound data acquisition unit 20 and the ultrasound image generation unit 23 are provided in the medical image diagnostic apparatus independently of the ultrasound probe 18, but the ultrasound probe 18 may include the ultrasound data acquisition unit 20 and the ultrasound image generation unit 23.

Figure 9:
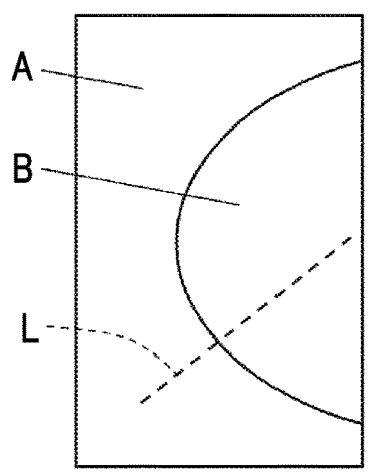
FIG. 9 is a diagram showing another example of the ultrasound image acquisition line displayed on the radiation image in a superimposed manner.

In addition, the ultrasound image acquisition line L generated by the line generation unit 22 can be displayed on the monitor 16 to be rotatable by a designation of the user via the input device 26, for example, as shown in FIG. 9. Even in this case, the ultrasound image generation unit 23 generates the ultrasound image U representing the tomographic section of the position of the linear ultrasound image acquisition line L extending obliquely with respect to the vertical direction and the lateral direction of the radiation image A. Therefore, the user can accurately examine the subject by checking the ultrasound image U representing the tomographic section of the position of any linear ultrasound image acquisition line L on the radiation image A.

In addition, the ultrasound image generation unit 23 can generate a plurality of the ultrasound images U at a plurality of positions in the vicinity of the ultrasound image acquisition line L on the radiation image A in addition to the ultrasound image U corresponding to the position of the ultrasound image acquisition line L on the radiation image A. In this case, the display controller 15 displays, on the monitor 16, the plurality of ultrasound images U generated by the ultrasound image generation unit 23. Since the user can also check a tissue structure in the vicinity of the position of the ultrasound image acquisition line L by checking the plurality of ultrasound images U, the accuracy of the examination can be improved. The display controller 15 can also display a range corresponding to the plurality of ultrasound images U on the radiation image A in a superimposed manner. Thereby, the user can easily understand the position of the tomographic section of the breast B represented by the plurality of displayed ultrasound images U.

In addition, the ultrasound image generation unit 23 can further generate a three-dimensional ultrasound image of the breast B of the subject based on the ultrasound data acquired in the entire range of the determined imaging region. In this case, the display controller 15 can display, on the monitor 16, the three-dimensional ultrasound image generated by the ultrasound image generation unit 23. Since the user can check a three-dimensional internal structure of the breast B by checking the three-dimensional ultrasound image in addition to the ultrasound image U corresponding to the ultrasound image acquisition line L, the accuracy of the examination can be improved.

Figure 10:
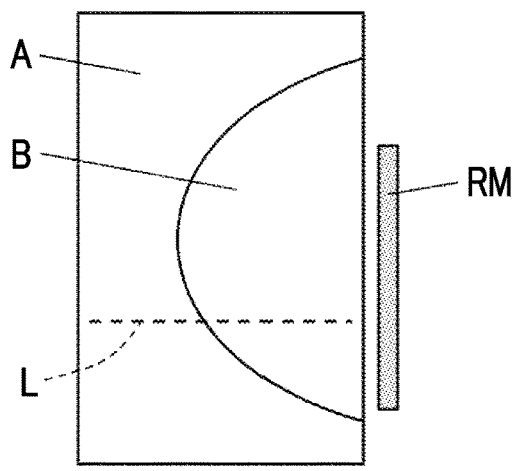
FIG. 10 is a diagram showing a display example of a movable range of the ultrasound image acquisition line.

In addition, the main body controller 25 can limit a movable range of the ultrasound image acquisition line L on the radiation image A moved by the user via the input device 26 to a determined imaging range of the ultrasound image U. In this case, the display controller 15 can display a movable range RM on the monitor 16 as shown in FIG. 10. Since the user can clearly understand the movable range RM of the ultrasound image acquisition line L, the user can smoothly decide the position of the ultrasound image acquisition line L.

Further, the main body controller 25 can also set the movable range RM of the ultrasound image acquisition line L in the radiation image A based on an instruction of the user via the input device 26. In a case where there is a region in which the unclear ultrasound image U is generated due to some cause, the clear ultrasound image U can be generated and displayed on the monitor 16 by setting the movable range RM of the ultrasound image acquisition line L to exclude the region.

Figure 11:
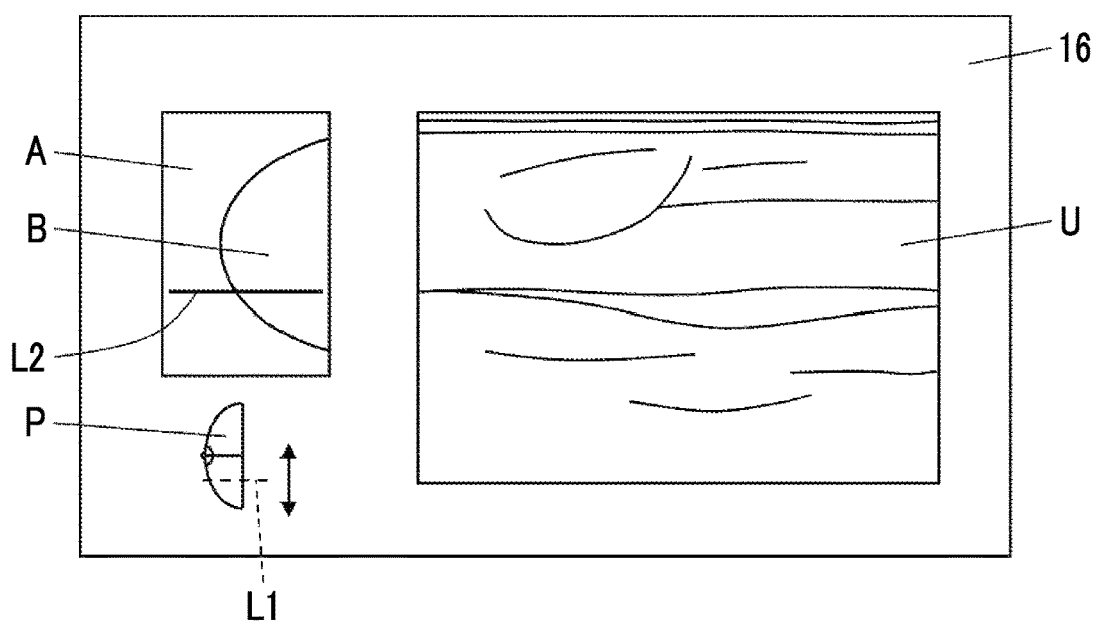
FIG. 11 is a diagram showing a display example of the radiation image, the ultrasound image, and a model diagram of a breast on the monitor.

In addition, for example, as shown in FIG. 11, the display controller 15 can also display, on the monitor 16, a model diagram P of the breast B of the subject on which an ultrasound image acquisition line L1 is superimposed. The user can move the position of the ultrasound image acquisition line L1 superimposed on the model diagram P via the input device 26. In this case, the display controller 15 moves the position of an ultrasound image acquisition line L2 on the radiation image A to correspond to the position of the ultrasound image acquisition line L1 on the model diagram P. The ultrasound image generation unit 23 generates the ultrasound image U corresponding to the position of the ultrasound image acquisition line L2 on the radiation image A, and the display controller 15 displays the ultrasound image U on the monitor 16.

Since the user can move the ultrasound image acquisition line L1 on the model diagram P more easily than directly moving the ultrasound image acquisition line L2 on the radiation image A, it is possible to smoothly proceed with the examination on the subject.

Embodiment 2

The medical image diagnostic apparatus can also detect, from the radiation image A, a suspected lesion region where the presence of the lesion including a so-called tumor is suspected.

Figure 12:
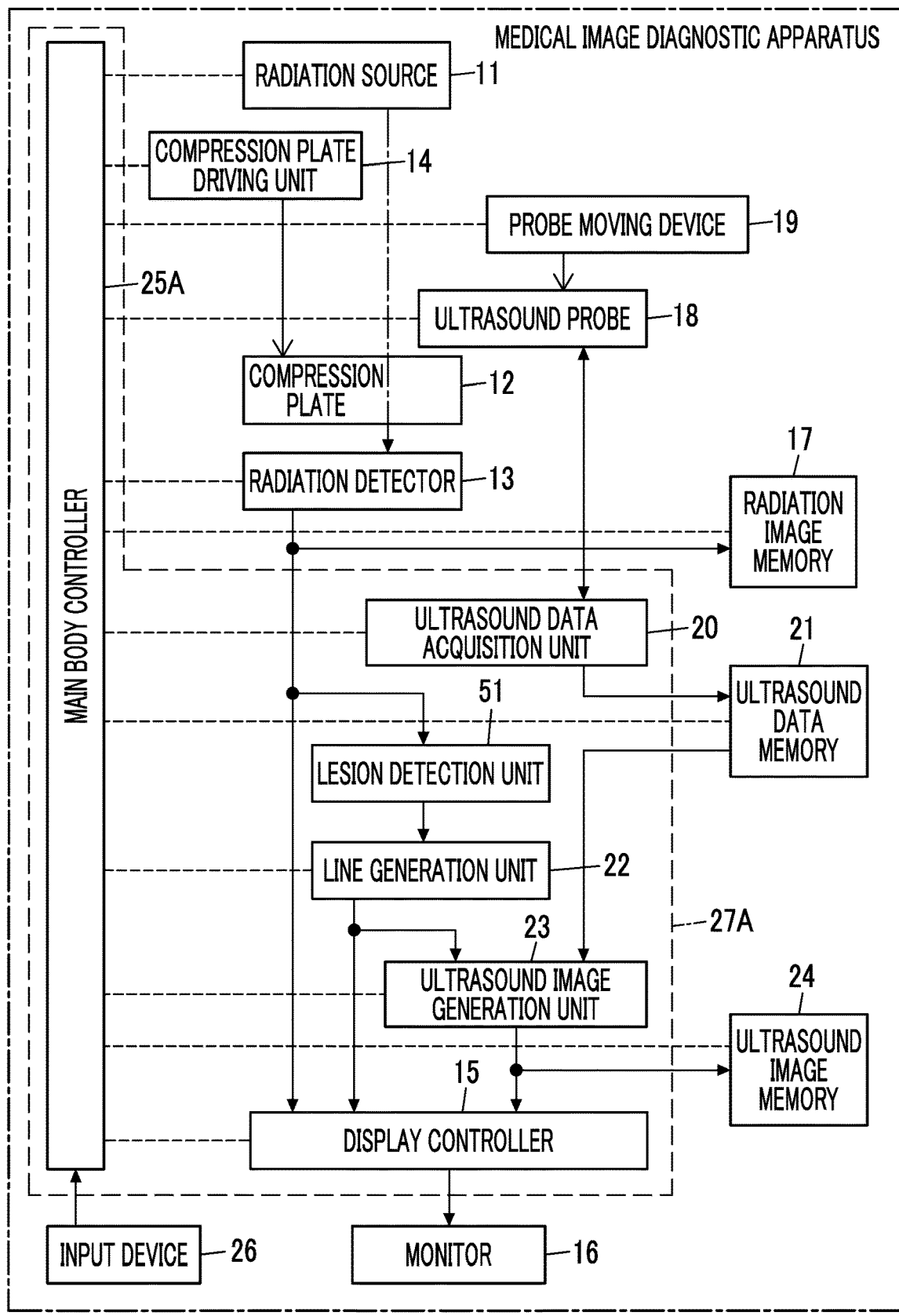
FIG. 12 is a block diagram showing a configuration of the medical image diagnostic apparatus according to an Embodiment 2 of the present invention.

FIG. 12 shows a configuration of a medical image diagnostic apparatus according to an Embodiment 2 of the present invention. A medical image diagnostic apparatus according to an Embodiment 2 comprises a lesion detection unit 51 and a main body controller 25A instead of the main body controller 25 in the medical image diagnostic apparatus according to the Embodiment 1 shown in FIG. 1.

In the medical image diagnostic apparatus of the Embodiment 2, the lesion detection unit 51 is connected to the radiation detector 13. The lesion detection unit 51 is connected to the line generation unit 22 and the main body controller 25A. In addition, the display controller 15, the ultrasound data acquisition unit 20, the line generation unit 22, the ultrasound image generation unit 23, the main body controller 25A, and the lesion detection unit 51 constitute a processor 27A for a medical image diagnostic apparatus of the Embodiment 2.

The lesion detection unit 51 detects a suspected lesion region based on the radiation image A generated by the radiation detector 13. The lesion detection unit 51 can detect a suspected lesion region by using, for example, an image analysis technique using a feature amount such as a so-called template matching, AdaBoost, an SVM, or an SIFT, or a machine learning model trained by using a machine learning technique such as deep learning. The machine learning model used here is a trained model that has been trained on lesion sites in a plurality of radiation images A of the breast B.

The line generation unit 22 automatically generates the ultrasound image acquisition line L positioned in the suspected lesion region in the radiation image A detected by the lesion detection unit 51.

The ultrasound image generation unit 23 generates the ultrasound image U corresponding to the ultrasound image acquisition line L positioned on the suspected lesion region in the radiation image A.

In general, in the radiation image A obtained by imaging the breast B of the subject, since both the suspected lesion region and the mammary gland region are depicted as high-brightness regions, it may be difficult to accurately determine the position of the suspected lesion region unless the user has a certain level of skill. According to the medical image diagnostic apparatus of the Embodiment 2, even in a case in which the user does not check the radiation image A to determine the position of the suspected lesion region, the suspected lesion region can be easily detected, and further the ultrasound image U of the suspected lesion region shown in the radiation image A can be easily acquired. Therefore, the accuracy of the examination on the subject can be improved.

EXPLANATION OF REFERENCES

11: radiation source
12: compression plate
12A: upper surface
13: radiation detector
14: compression plate driving unit
15: display controller
16: monitor
17: radiation image memory
18: ultrasound probe
19: probe moving device
20: ultrasound data acquisition unit
21: ultrasound data memory
22: line generation unit
23: ultrasound image generation unit
24: ultrasound image memory
25, 25A: main body controller
26: input device
27, 27A: processor
28: imaging table
28A: imaging surface
29: arm part
30: shaft part
31: base
41: transducer array
42: pulsar
43: amplification unit
44: AD conversion unit
45: beam former
46: signal processing unit
47: DSC
48: image processing unit
51: lesion detection unit
A: radiation image
B: breast
G1: first guide
G2: second guide
D1: first direction
D2: second direction
L, L1, L2: ultrasound image acquisition line
P: model diagram
R: radiation
RM: movable range
U: ultrasound image

What is claimed is:

1. A medical image diagnostic apparatus that acquires a radiation image of a breast of a subject in a state in which the breast is compressed by a compression plate, the medical image diagnostic apparatus comprising:
a monitor;
an ultrasound probe that is disposed to be in contact with a surface of the compression plate;
a probe moving device configured to move the ultrasound probe along the surface of the compression plate;
a processor configured to
acquire ultrasound data of the breast in an imaging region determined by performing transmission and reception of an ultrasound wave using the ultrasound probe moved by the probe moving device with respect to the breast compressed by the compression plate,
display the radiation image on the monitor,
generate an ultrasound image acquisition line, which is displayed on the radiation image displayed on the monitor in a superimposed manner and designates a position of an ultrasound image representing a tomographic section of the breast, wherein the superimposed ultrasound image acquisition line is displayed on the monitor to be rotatable by a designation of a user; and generate an ultrasound image at a position of the ultrasound image acquisition line based on the ultrasound data which is acquired in correspondence with the ultrasound image acquisition line, and display the ultrasound image on the monitor.

2. The medical image diagnostic apparatus according to claim 1, wherein the processor is configured to generate the ultrasound image acquisition line at a position designated by the user on the radiation image.

3. The medical image diagnostic apparatus according to claim 2, wherein the processor is configured to display the determined imaging region on the monitor in correspondence with the radiation image, and generate the ultrasound image acquisition line at a position designated by the user in the determined imaging region.

4. The medical image diagnostic apparatus according to claim 3, wherein the processor is configured to drive and control the probe moving device such that the ultrasound data of the breast in an entire range in the determined imaging region is acquired by scanning the ultrasound probe.

5. The medical image diagnostic apparatus according to claim 3, wherein the processor is configured to generate a three-dimensional ultrasound image.

6. The medical image diagnostic apparatus according to claim 2, wherein the ultrasound probe includes a transducer array in which a plurality of transducers are arranged, the processor is configured to generate a linear ultrasound image acquisition line extending in an arrangement direction of the plurality of transducers, and display the ultrasound image acquisition line to be movable in a direction orthogonal to the arrangement direction of the plurality of transducers by a designation of the user, on the monitor.

7. The medical image diagnostic apparatus according to claim 6, wherein the processor is configured to drive and control the probe moving device such that the ultrasound data of the breast in an entire range in the determined imaging region is acquired by scanning the ultrasound probe.

8. The medical image diagnostic apparatus according to claim 6, wherein the processor is configured to generate a three-dimensional ultrasound image.

9. The medical image diagnostic apparatus according to claim 2, wherein the processor is configured to drive and control the probe moving device such that the ultrasound data of the breast in an entire range in the determined imaging region is acquired by scanning the ultrasound probe.

10. The medical image diagnostic apparatus according to claim 2, wherein the processor is configured to generate a three-dimensional ultrasound image.

11. The medical image diagnostic apparatus according to claim 1, wherein the processor is configured to detect a suspected lesion region based on the radiation image, and generate the ultrasound image acquisition line positioned at the suspected lesion region of the radiation image.

12. The medical image diagnostic apparatus according to claim 11, wherein the processor is configured to generate a plurality of the ultrasound images in a vicinity of the ultrasound image acquisition line, and display the plurality of ultrasound images on the monitor.

13. The medical image diagnostic apparatus according to claim 12, wherein the processor is configured to drive and control the probe moving device such that the ultrasound data of the breast in an entire range in the determined imaging region is acquired by scanning the ultrasound probe.

14. The medical image diagnostic apparatus according to claim 11, wherein the processor is configured to drive and control the probe moving device such that the ultrasound data of the breast in an entire range in the determined imaging region is acquired by scanning the ultrasound probe.

15. The medical image diagnostic apparatus according to claim 1, wherein the processor is configured to drive and control the probe moving device such that the ultrasound data of the breast in an entire range in the determined imaging region is acquired by scanning the ultrasound probe.

16. The medical image diagnostic apparatus according to claim 1, wherein the processor is configured to generate a three-dimensional ultrasound image.

17. A control method of a medical image diagnostic apparatus that acquires a radiation image of a breast of a subject in a state in which the breast is compressed by a compression plate, the control method comprising:

disposing an ultrasound probe to be in contact with a surface of the compression plate;

moving the ultrasound probe along the surface of the compression plate;

acquiring ultrasound data of the breast in an imaging region determined by performing transmission and reception of an ultrasound wave using the ultrasound probe with respect to the breast compressed by the compression plate;

displaying the radiation image on a monitor;

generating an ultrasound image acquisition line representing a position of an ultrasound image to be acquired and displaying the ultrasound image acquisition line on the radiation image displayed on the monitor in a superimposed manner, wherein the superimposed ultrasound image acquisition line is displayed on the monitor to be rotatable by a designation of a user;

generating an ultrasound image at a position of the ultrasound image acquisition line based on the ultrasound data acquired in correspondence with the ultrasound image acquisition line; and displaying the generated ultrasound image on the monitor.

* * * * *